United States Patent [19]

Weng

[11] Patent Number: 5,623,929

[45] Date of Patent: Apr. 29, 1997

[54] ULTRASONIC DOPPLER FLOW IMAGING METHOD FOR ELIMINATING MOTION ARTIFACTS

[75] Inventor: Lee Weng, Issaquah, Wash.

[73] Assignee: Siemens Medical Systems, Inc., Iselin, N.J.

[21] Appl. No.: 497,344

[22] Filed: Jun. 30, 1995

[51] Int. Cl.$^6$ .................................................. A61B 8/06
[52] U.S. Cl. ............................................ 128/661.09
[58] Field of Search ...................... 128/660.05, 660.07, 128/661.07–661.1

[56] References Cited

U.S. PATENT DOCUMENTS

| | | | |
|---|---|---|---|
| 4,800,891 | 1/1989 | Kim ................................. | 128/661.09 |
| 4,809,703 | 3/1989 | Ishikawa et al. .................. | 128/661.08 |
| 4,961,427 | 10/1990 | Namekawa et al. ............... | 128/661.09 |
| 5,170,792 | 12/1992 | Sturgill et al. .................... | 128/661.08 |
| 5,188,112 | 2/1993 | Sturgill et al. .................... | 128/661.09 |
| 5,197,477 | 3/1993 | Peterson et al. ................... | 128/661.08 |
| 5,469,850 | 11/1995 | Iizuka et al. ...................... | 128/660.07 |
| 5,483,962 | 1/1996 | Shiba ................................. | 128/660.05 |
| 5,544,659 | 8/1996 | Banjanin .......................... | 128/661.09 |

*Primary Examiner*—Francis Jaworski

[57] ABSTRACT

An ultrasonic diagnostic system is provided that removes the effects of image motion from the received Doppler information signals, allowing the display of a fluid flow image without image motion artifacts. The Doppler information signals received from an ultrasonic transducer include velocity components due to both the fluid flow through a subject as well as image motion. The Doppler information signals are demodulated to provide Doppler baseband signal samples containing a fluid motion component and an image motion component. An image motion vector is estimated from a comparison of consecutive image frames, and a relative Doppler frequency between the fluid motion component and the image motion component is derived utilizing the estimated image motion vector. A fluid motion vector can then be derived from the derived relative Doppler frequency.

20 Claims, 4 Drawing Sheets

ULTRASONIC DOPPLER FLOW IMAGING METHOD FOR ELIMINATING MOTION ARTIFACTS

RELATED APPLICATION

This patent application relates to copending application Ser. No. 08/414,978, filed Mar. 31, 1995, for METHOD AND APPARATUS FOR GENERATING LARGE COMPOUND ULTRASOUND IMAGE.

BACKGROUND OF THE INVENTION

1. Field of the Invention

This invention relates to ultrasonic diagnostic imaging using Doppler shift measurement for detection and display of fluid flow velocities, and more particularly, to an imaging system in which undesirable image artifacts are eliminated by use of an image registration method that enables accurate image motion measurement.

2. Description of Related Art

Ultrasonic imaging techniques are commonly used to produce two-dimensional diagnostic images of internal features of an object, such as a human anatomy. A diagnostic ultrasonic imaging system for medical use forms images of internal tissues of a human body by electrically exciting an acoustic transducer element or an array of acoustic transducer elements to generate short ultrasonic pulses that travel into the body. The ultrasonic pulses produce echoes as they reflect off of body tissues that appear as discontinuities or impedance changes to the propagating ultrasonic pulses. These echoes return to the transducer, and are converted back into electrical signals that are amplified and decoded to produce a cross-sectional image of the tissues. These ultrasonic imaging systems are of significant importance to the medical field by providing physicians with real-time, high resolution images of the internal features of a human anatomy without resort to more invasive exploratory techniques, such as surgery.

The acoustic transducer which radiates the ultrasonic pulses typically comprises a piezoelectric element or matrix of piezoelectric elements. As known in the art, a piezoelectric element deforms upon application of an electrical signal to produce the ultrasonic pulses. In a similar manner, the received echoes cause the piezoelectric element to deform and generate the corresponding electrical signal. The acoustic transducer may be packaged within a handheld device that allows the physician substantial freedom to manipulate the transducer easily over a desired area of interest. The transducer would then be electrically connected via a cable to a central control device that generates and processes the electrical signals. In turn, the control device transmits the image information to a real-time viewing device, such as a video display terminal (VDT). The image information may also be stored to enable other physicians to view the diagnostic images at a later date.

One particular application of ultrasonic diagnostic imaging takes advantage of Doppler shift measurement to detect and display fluid flow velocities. In such a system, a region of interest within a patient is repetitively pulsed with ultrasonic signals, and the received echo signals are compared with a reference to determine a rate of flow of fluids through the region. The rate of flow can be determined from a measurement of the Doppler frequency shift of the received echo signals, such as disclosed in U.S. Pat. No. 4,800,891, issued to Kim, for DOPPLER VELOCITY PROCESSING METHOD AND APPARATUS. As known in the art, the flow velocity can then be displayed within a colorized cross-sectional image in which different shading and color intensity represents flow rate and direction. These ultrasonic color flow imaging systems are particularly advantageous in detecting blood flow through a vessel, such as within the heart.

A drawback of Doppler flow measurement systems is that they cannot easily distinguish between fluid flow and other types of movement, such as due to transducer or tissue motion. As a result, any relative motion between the transducer and the region of interest can be improperly interpreted as fluid flow. Such Doppler flow measurement systems are therefore susceptible to an imaging artifact referred to as "color flashing," in which color flow image data is displayed in regions where there is no actual flow. Slight movement of the transducer changes the ultrasonic path length by an amount sufficient to cause a Doppler frequency shift that is similar to the Doppler shift generated by blood flow. The motion induced artifact appears on the image display as a flashing or flickering of the colorized portion of the image. This color flashing can significantly hinder ultrasound diagnosis by yielding false motion indications. While it is possible to mitigate the color flashing by keeping the transducer motion to a minimum, a physician may find it desirable to intentionally move the transducer along the skin surface while simultaneously observing the blood flow rate through a particular vessel.

In conventional color flow imaging systems, removal of signals arising from tissue movement is accomplished with a high pass filter. The filter characteristics incorporate certain assumptions about the maximum frequency of tissue motion signals which determine the necessary cut-off frequency of the filter. In practice, however, the frequency spectrum of the tissue motion signals is not stationary, and cannot be entirely eliminated by the filter without losing some desirable fluid flow motion information. Transducer motion signals tend to be even more complex and less predictable, and thus are considerably more difficult to remove through use of conventional filtering techniques.

Various signal processing techniques have been proposed for eliminating unwanted signals within ultrasonic imaging systems, such as U.S. Pat. No. 4,961,427, issued to Namekawa, for ULTRASONIC DOPPLER DIAGNOSTIC APPARATUS. Namekawa discloses an approach to compensating for unwanted signal clutter during signal down-conversion to baseband using an RF signal mixer. Since the baseband signal is complex (i.e., having in-phase (I) and quadrature (Q) components), tissue motion compensation is accomplished using a tissue velocity signal as the complex reference signal. Unfortunately, this approach provides only limited effectiveness in compensating for tissue motion, since it does not account for spectral changes in the received signal other than mean tissue frequency, e.g., tissue motion signal power and spectral width. Moreover, the prior art techniques do not compensate for signal components that result from transducer motion, whether intentional or unintentional.

Accordingly, a critical need exists for an ultrasonic diagnostic imaging system for detection and display of fluid flow velocities that is capable of compensating for both tissue and transducer motion. The imaging system should permit a physician to readily manipulate the transducer across a region of interest while simultaneously monitoring fluid flow rates and direction.

SUMMARY OF THE INVENTION

In accordance with the teachings of this invention, an ultrasonic diagnostic system is provided that removes the effects of image motion from the received Doppler information signals, allowing the display of a fluid flow image without image motion artifacts.

The Doppler information signals received from an ultrasonic transducer include velocity components due to both the fluid flow through a subject as well as image motion. The Doppler information signals are demodulated to provide Doppler baseband signal samples containing a fluid motion component and an image motion component. An image motion vector is estimated from a comparison of consecutive image frames, and a relative Doppler frequency between the fluid motion component and the image motion component is derived utilizing the estimated image motion vector. A fluid motion vector can then be derived from the derived relative Doppler frequency.

In order to estimate the image motion vector, a current image frame is divided into a plurality of sub-image regions. Local motion vectors of the respective sub-image regions are estimated between the current image frame and a previous image frame. The local motion vectors are estimated by calculating an initial estimation of the local motion vectors using a fast adaptive coarse/fine minimum-sum-absolute-difference (MSAD) search, and deriving a final estimation of the local motion vectors from the initial estimation of the local motion vectors by use of a fuzzy logic technique. The local motion vectors are then used to derive the relative Doppler frequency between the fluid motion component and the image motion component.

DETAILED DESCRIPTION

Figure 1:
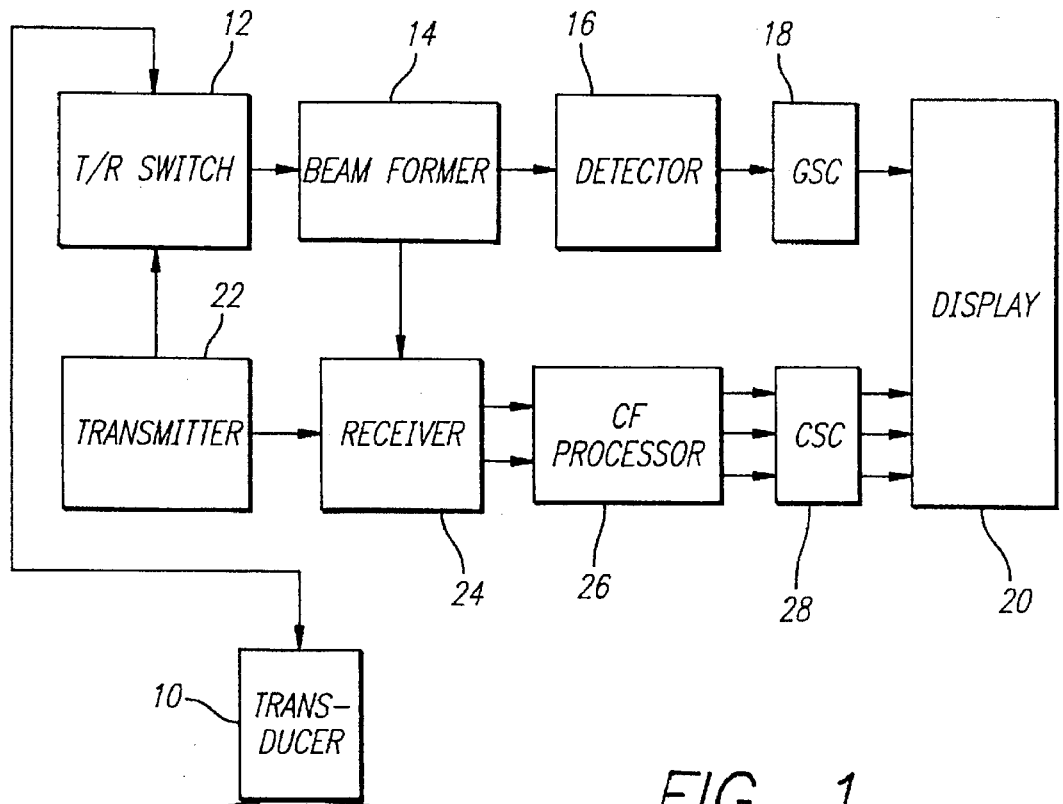
FIG. 1 is a block diagram illustrating an ultrasonic Doppler flow imaging system of this invention.

This invention satisfies the critical need for an ultrasonic diagnostic imaging system for detection and display of fluid flow velocities that is capable of compensating for both tissue and transducer motion. The imaging system permits a physician to readily manipulate the transducer across a region of interest while simultaneously monitoring fluid flow rates and direction. In the detailed description that follows, like reference numerals are used to describe like elements in one or more of the figures.

Referring first to FIG. 1, a block diagram of an ultrasonic diagnostic imaging apparatus is illustrated. A transmitter 22 generates a plurality of high frequency electronic signals that are amplified and provided to a piezoelectric transducer 10 through a transmit/receive (T/R) switch 12. The transducer 10 is comprised of a plurality of individual piezoelectric elements that are disposed in an array configuration. The transducer elements convert the respective electronic signals into ultrasonic pulsed waves that are coupled into an imaging region of interest 30 of a patient. The pulsed waves return to the transducer elements in the form of echo signals that are converted by the transducer elements back into high frequency electronic signals that are provided to a beamformer 14 through the T/R switch 12. The T/R switch 12 provides electrical isolation of the beamformer 14 during a transmit phase of the imaging apparatus.

In the illustration of FIG. 1, the region of interest 30 includes an exemplary organ 32 and a blood vessel 34. The echoes of the ultrasonic pulsed waves are received by the transducer 10, including relatively large amplitude echoes from the stationary tissue within the region of interest 30, and relatively small amplitude echoes from blood that is flowing with velocity V in the blood vessel 34. The beamformer 14 amplifies and digitizes the individual echo signals from each transducer element, adds an appropriate delay to the respective signals to account for relative path length differences, then combines the signals to produce a beamline signal which is applied as an input to a gray scale detector 16 and receiver 24. The gray scale detector 16 extracts a low frequency envelope signal from the beamline signal and transmits the low frequency envelope signal to a gray scale converter (GSC) 18. The gray scale converter 18 rearranges the scan order of the low frequency envelope signal and applies it to a display sub-system 20 that display a gray scale image in a manner that is well known in the art.

Since the echo signals from tissue within the region of interest are much stronger than the echo signals from blood flow in the vessel 34, the gray scale image of the blood flow is substantially obscured by the images of tissue features. In order to generate a color flow image of the blood flow, additional signal processing is necessary within the receiver 24 and a color flow (CF) processor 26. The receiver 24 down-converts the relatively high frequency RF beamline signals received from the beamformer 14 to relatively low frequency in-phase (I) and quadrature (Q) baseband signal samples using a reference RF signal from the transmitter 22, and transmits these I and Q signal samples to the color flow processor 26. The fluid flow velocity information contained in the I, Q signal samples is encoded as phase shifts in relation to the reference RF signal. The color flow processor 26 develops estimates of various parameters of the I, Q signal samples representative of movement in the scanned area and provides these estimates to a color flow scan converter (CSC) 28. The color flow scan converter 28 converts the scanning order of the estimated parameters to a format suitable for forming a color flow image and provides the parameters to the display sub-system 20.

Figure 6A:
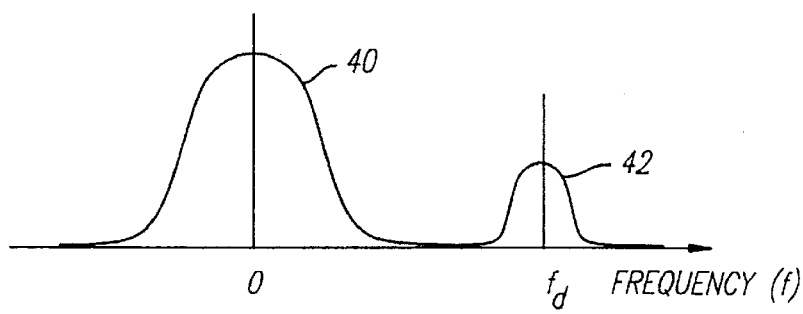
FIG. 6A is a graph illustrating Doppler frequency response of a signal containing both tissue and blood motion components.
Figure 6B:
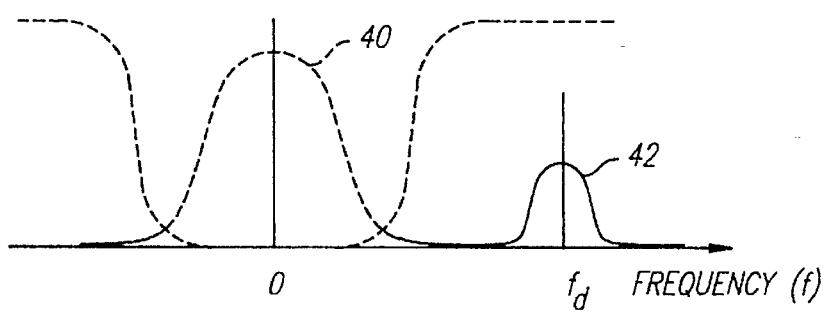
FIG. 6B is a graph as in FIG. 6A in which a high pass filter is utilized to attenuate tissue components from the signal.

The Doppler velocity information content of the I, Q signal samples are illustrated with respect to a Doppler frequency spectrum as shown in FIG. 6A. The frequency spectrum of FIG. 6A contains two peaks, including a major peak 40 and a minor peak 42. The major peak 40 results from echo information from the tissue and the minor peak 42 results from echo information from the fluid. The major peak 40 may have substantially greater amplitude because tissue is a stronger reflector of ultrasonic waves than blood. In FIG. 6A, the major peak 40 is located at zero because the reflecting tissue has substantially no motion component, and the minor peak 42 is located at the Doppler frequency $f_d$. Accordingly, the spectral components of the major peak 40 may be readily eliminated by high pass filtering the I, Q signal samples. FIG. 6B illustrates the application of a high pass filter having a cutoff boundary disposed symmetrically about zero to eliminate the major peak 40 while leaving the minor peak 42 intact. The use of a high pass filter to eliminate signal sample components resulting from stationary tissue echoes is well known in the art.

Figure 7:
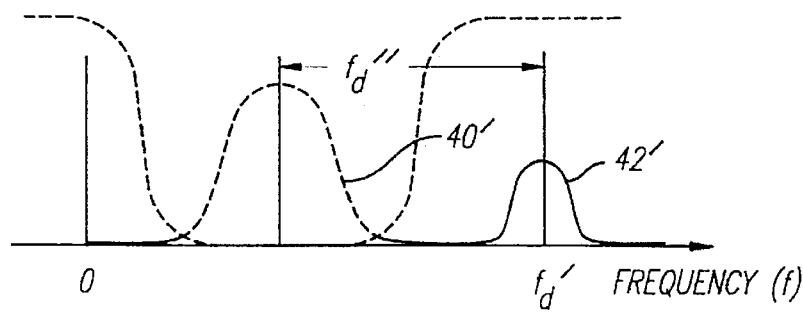
FIG. 7 is a graph illustrating Doppler frequency response of a signal containing both image motion and blood motion components.

Elimination of the major peak 40 becomes substantially more difficult when there is a motion component to the I, Q signal samples. In FIG. 7, both the major peak 40' and the minor peak 42' are displaced from zero due to tissue and/or transducer motion (hereinafter collectively referred to as image motion). The magnitude of the displacement is dependent upon the extent of the image motion, and thus is not constant. As a result, the high pass filtering technique described above would be ineffective in eliminating the spectral components of the major peak 40.

Figure 2:
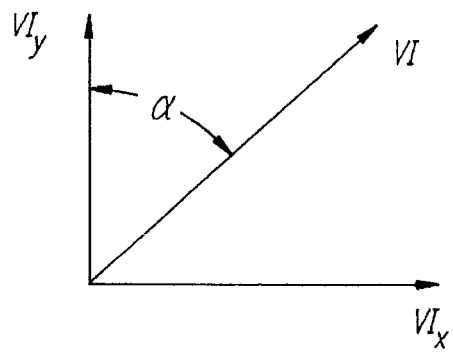
FIG. 2 is a graph illustrating an image motion vector.
Figure 3:
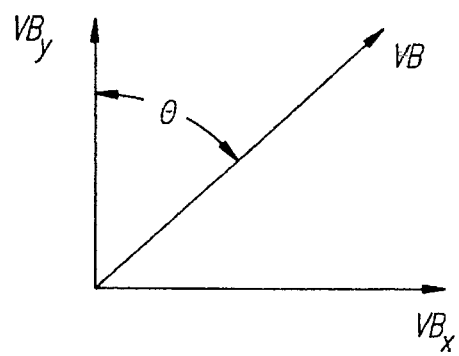
FIG. 3 is a graph illustrating a blood motion vector.

In this invention, before application of the high pass filtering, the blood motion components are isolated from the Doppler spectrum through derivation of an estimate of the image motion components. As illustrated in FIG. 2, an image motion vector VI has components $VI_x$ and $VI_y$, and a direction $\alpha$. Similarly, as illustrated in FIG. 3, a blood motion vector VB has components $VB_x$ and $VB_y$, and a direction $\theta$. In the absence of image motion, the blood motion vector can be described by the following equation:

$$VB = \frac{f_d c}{2 f_0 \cos\theta}$$

in which c is the speed of sound, and $f_0$ is the transducer operating frequency. In the presence of image motion, however, the Doppler frequency of the minor peak 42' shifts to $f_d'$, which is given by the following equation:

$$f_d' = \frac{2VB \cos\theta}{c} f_0 + \frac{2VI \cos\alpha}{c} f_0$$

in which the first term of the equation represents the frequency component due to the blood motion vector and the second term represents the frequency component due to the image motion vector.

From the foregoing it follows that the relative Doppler frequency $f_d''$ between the major peak 40' and the minor peak 42' is given by the following equation:

$$f_d'' = f_d' - \frac{2VI \cos\alpha}{c} f_0$$

which can also be expressed as:

$$f_d'' = f_d' - \frac{2VI_y}{c} f_0$$

The second term in the relative Doppler frequency $f_d''$ relation is related to the image motion caused by transducer or tissue motion, and thus can be derived from a measurement of $VI_y$, the image motion vector in the y direction.

Figure 5:
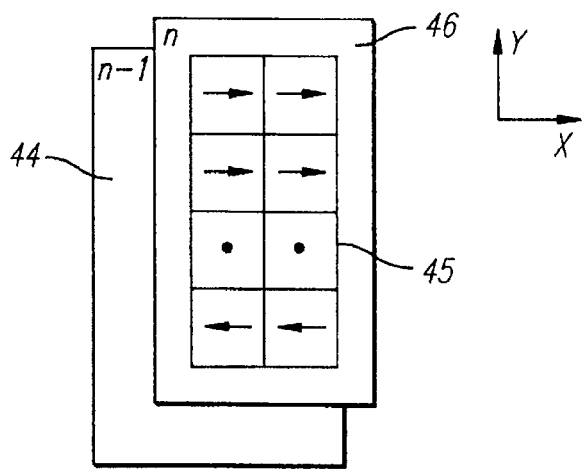
FIG. 5 is a block diagram illustrating derivation of a local image motion vector.
Figure 4:
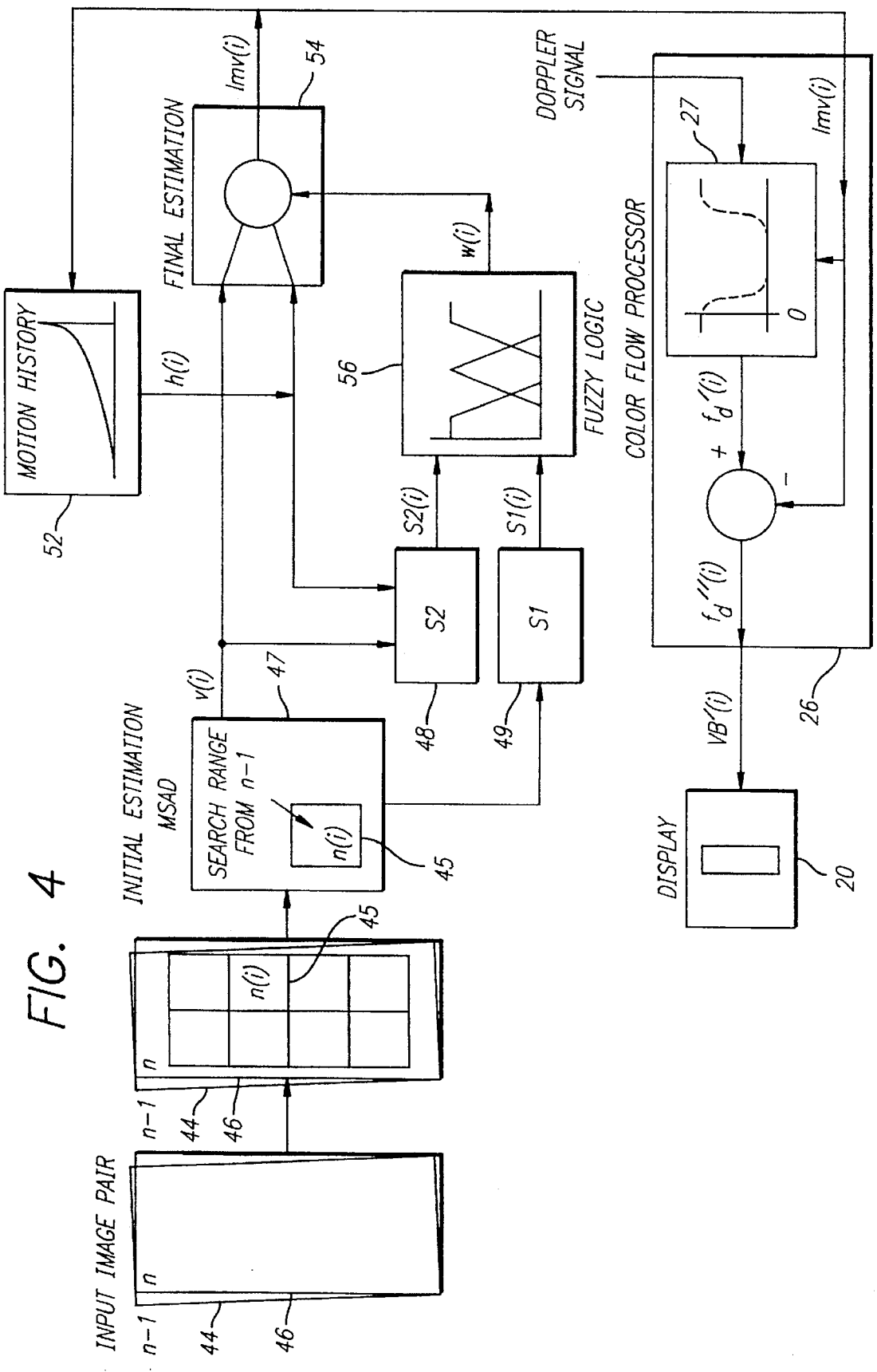
FIG. 4 is a block diagram illustrating an image registration based image motion measurement method.

Referring now to FIG. 4, an image registration based method for measuring image motion is illustrated. Two consecutive image frames 44, 46 (also referred to respectively as image frames n-1 and n) are compared to derive and estimate of motion of the image. As illustrated in FIG. 5, frame n is divided into a plurality of sub-frame regions 45, and the local motion of each of the sub-frame regions is estimated. Each of the sub-frame regions of FIG. 5 has a respective local motion vector v(i). For I total sub-frame regions, the i'th sub-frame region of frame n is defined as n(i).

The particular size and number of the sub-frame regions 45 are selected by consideration of various factors. The sub-frame region size should approximate the size of the particular image features. For example, image features such as tissue boundaries and blood vessels would require a relatively small sub-frame region size. Nevertheless, such a small sub-frame region size would not be suitable for estimation of motion because the small sub-frame region size decorrelates very rapidly with relatively large magnitudes of motion. Moreover, the small sub-frame region size would not be stable for in-vivo images where small scale tissue motion exists. At the same time, if the sub-frame region size is too large, there will be too few sub-frame regions per image frame for motion estimation and the motion estimation will be unstable. Further, a large sub-frame region size may introduce an image rotation error into the local motion estimation where the sub-frame region is incorrectly assumed to have a translation component but no rotation component.

In a preferred embodiment of the invention, a sub-frame region size of approximately 48×48 pixels is deemed acceptable for motion estimation in view of these factors in relation to an image frame size of about 200×400 pixels. A minimum sub-frame region size of 32×32 pixels could also be utilized in relation to a smaller image size. These sub-frame region sizes result in a number I between approximately eight and twenty in order to yield the best results.

The local motion of each sub-frame region n(i) of image n is estimated by moving the sub-frame region n(i) around on the n-1 image frame to find the "best match." Specifically, the current frame n is matched with a portion of the n-1 image frame which includes the region of interest. The "best match" is determined by use of a minimum-sum-absolute-difference technique (MSAD) 47 to match the n(i) sub-frame regions 45 with the associated region of the n-1 image frame. The sum-absolute-difference (SAD) is the sum of absolute differences between corresponding pixel values between each sub-frame region 45 and the n-1 image frame. The "best match" between the sub-frame region 45 and the n-1 image region occurs where the SAD value is at a minimum. The MSAD technique is used to derive a first estimation of the local motion vector v(i) having a direction and magnitude indicating how the sub-frame region n(i) translated from the n-1 image frame to the n image frame. The direction of the local motion vector v(i) for each one of the sub-frame regions 45 is denoted by the arrows of FIG. 5. It should be noted that the sub-frame regions 45 that do not contain any arrows have experienced negligible local motion.

It should be apparent that calculating the MSAD could be a very slow computing process if the number of sub-frame regions is large, the sub-frame region size is large, and the search region is large. For example, a frame n having sixteen sub-frame regions 45 with a 48×48 pixel size and a search region of 64×64 pixels would require about 300,000,000 separate additions/subtractions and about 65,000 comparisons to complete a single MSAD computation. Even with the relatively high speed of conventional processors, this would still encompass too much computation to accommodate real-time application. Accordingly, various search techniques are utilized in order to reduce the magnitude of the MSAD computation.

One such technique for calculating the MSAD utilizes a conventional MPEG encoder. MPEG, or Moving Picture Expert Group, is an industry accepted data compression standard for digitizing graphical information. MPEG encoders are commercially available that can be used to perform a rough estimate of MSAD location based on historical movement of the image. A "best match" is sought between an image characteristic within a sub-frame region 45 and a n−1 image region by searching within a local neighborhood comprising a finite dimensional range, such as within ten pixels in the x and y directions relative to the image characteristic. A drawback of the use of an MPEG encoder is that it results in a high incidence of inaccurate local motion vectors, which must be filtered out.

Alternatively, a fast adaptive coarse/fine MSAD search strategy can be devised that significantly reduces the total magnitude of computation. A coarse search can be performed first to reduce the n−1 image region to a smaller area, followed by a fine search within the smaller area. The two-dimensional MSAD search can be reduced to two one-dimensional searches in the x and y directions, respectively. The first search should be conducted in the x direction to quickly narrow down the search region, followed by subsequent alternating one-dimensional searches in both the x and y directions to quickly find the MSAD location. Points which have been searched during the coarse search or have been searched in the other direction could be skipped during the fine search. Based on the above search strategy, in most cases the location of the MSAD can be identified after one coarse and one medium search in the x direction, one coarse search in the y direction and one small two-dimensional fine search in both directions. For the same example given above, the total number of computations can be reduced to 2,600,000 additions/subtractions and 560 comparisons; representing a reduction of the total number of computations by roughly 115 times.

Under the influence of image noise, tissue motion and other image artifacts, the first MSAD motion estimation is not always very reliable. Accordingly, two measures of the quality and reliability of the first local motion vector estimation v(i) are devised, termed S1(i) and S2(i). S1(i) is a quality factor of MSAD, and measures the difference between the value of MSAD and mean SAD. MSAD quality increases with the value of S1(i), i.e., the deeper the SAD valley, the better is MSAD quality. When strong image noise exists, or when there is a lack of image features, the SAD map will become more flat so that S1(i) becomes smaller. In that case, the estimation of v(i) becomes less reliable.

The second parameter S2(i) measures how much v(i) deviates from the motion history 52. The motion history of the i'th subframe region, h(i) is the recursively averaged sum of previous final local motion vector outputs of the i'th sub-frame region. S2(i) is the vector difference between v(i) and h(i). Generally, image motion is fairly smooth and consistent for both experienced and un-experienced ultrasound operators. If one value of v(i) has a very different direction and magnitude as compared with its history, it is very likely that this estimation is under the influence of noise or local tissue motion and does not accurately reflect true image local motion. In this case the v(i) estimation is not very reliable. Thus, a large value of S2(i) indicates that the estimated v(i) is less reliable.

While the above estimation quality control concept is easy to understand, it is difficult to implement in practice since image changes caused by motion of the transducer can be rather complex. Accordingly, the quality and reliability of the motion estimate can be efficiently quantized by use of fuzzy logic. A fuzzy logic control block 56 receives S1(i) and S2(i) as inputs, combines them using fuzzy rules (described below), and produces a single numerical output w(i) which represents a degree of accuracy of v(i). The numerical output w(i) ranges from zero to one, with the estimation accuracy of v(i) increasing as w(i) approaches one.

Figure 8B:
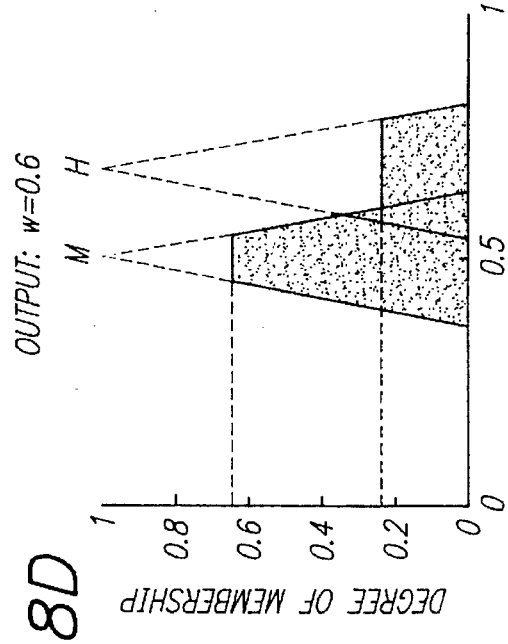
FIGS. 8A through 8D are graphs illustrating fuzzy logic membership functions for deriving the image registration based image motion measurement.
Figure 8D:
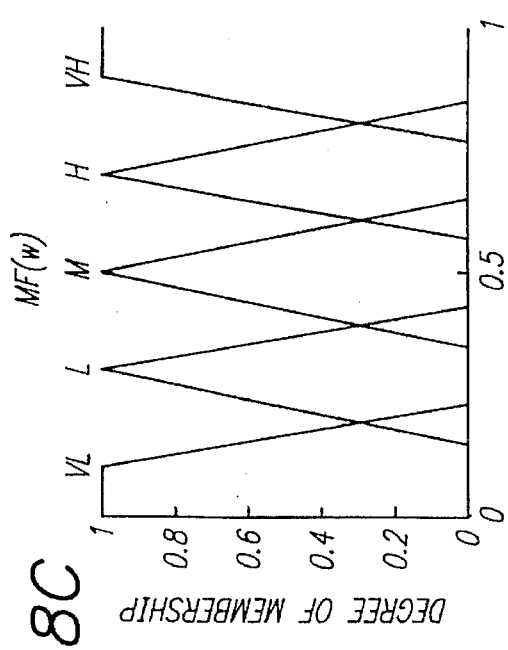
Figure 8A:
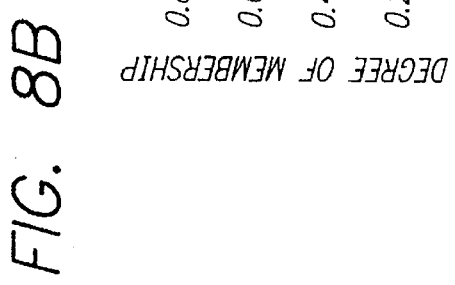
Figure 8C:
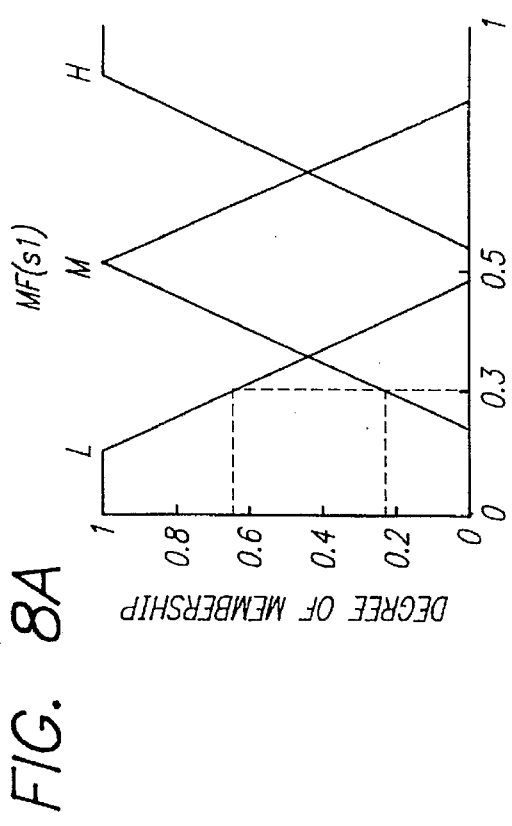

The inputs S1(i) and S2(i) are first "fuzzified" into the linguistic expressions, or labels, "high", "medium" and "low". Output w (i) also has its fuzzy expression as "very high", "high", "medium", "low" and "very low". Membership functions of S1(i), S2(i) and w(i) are defined from a large number of experimental results, and are illustrated at FIGS. 8A through 8C, respectively. The membership function of S1(i) is graphically illustrated at FIG. 8A as comprising three regions labeled as L (low), M (medium) and H (high). The regions overlap to a certain extent; specifically, the L and M regions overlap, and the M and H regions overlap. The horizontal axis of the membership function graph defines the measured value of S1 (i), and the vertical axis defines the degree of membership of the measured value within the defined label.

The membership function of S2(i) is graphically illustrated at FIG. 8B, and is constructed similar to the membership function of S1(i). Similarly, the membership function of w(i) is graphically illustrated at FIG. 8C, and is constructed similar to the membership functions of S1(i) and S2 (i), though it includes five overlapping regions labeled as VL (very low), L (low), M (medium), H (high), and VH (very high).

Seven fuzzy rules are used to define the relationship between S1 (i), S S2 (i) and w(i). These fuzzy rules include:

(1) If S1(i) is low (L) AND S2(i) is also low (L), then w(i) is medium (M);

(2) If S1(i) is medium (M) AND S2(i) is low (L), then w(i) is high (H);

(3) If S1(i) is high (H) AND S2(i) is low (L), then w(i) is very high (VH);

(4) If S1(i) is low (L) AND S2(i) is medium (M), the w (i) is low (L);

(5) If S1 (i) is medium (M) AND S2 (i) is also medium (M), then w (i) is medium (M);

(6) If S1(i) is high (H) AND S2(i) is medium (M), then w (i) is high (H); and (7) If S2(i) is high (H), then w(i) is very low (VL).

The fuzzy rules are applied in parallel to determine the truth of the rules. For example, assume that measured values of S1(i) and S2(i) are 0.3 and 0.1, respectively. In FIG. 8A, a measured value of 0.3 relates to degrees of membership of approximately 0.65 in the L label and approximately 0.25 in the M label. In FIG. 8B, a measured value of 0.1 relates to a degree of membership of approximately 0.75 in the L label only. As a result, only the first two fuzzy rules are true, though they yield inconsistent results in that the first fuzzy rule concludes w(i) is medium and the second fuzzy rule concludes that w(i) is high. The output w(i) must be converted back to a numerical value, and the inconsistent results must be reconciled.

Under the first fuzzy rule, the low value of S1(i) is combined using a logical AND with the low value of S2(i) to provide the medium value of w(i). Under the logical AND operation, the minimum value of the truth of the expressions is taken as the truth level of the rule. In other words, the 0.65 degree of membership of S1(i) is less than the 0.75 degree of membership of S2(i), and is thus taken as the truth level for the first fuzzy rule. Similarly, under the second fuzzy rule, the medium value of S1(i) is combined using a logical AND with the low value of S2(i) to provide the high value of w(i). The 0.25 degree of membership of S1(i) is less than the 0.75 degree of membership of S2(i), and is thus taken as the truth level for the second fuzzy rule. The M and H labels of the w(i) membership function are then truncated at the truth levels defined by the fuzzy rules, as illustrated graphically in FIG. 8D.

Finally, a centroid defuzzification technique is used to convert the fuzzy output back to a numerical number w(i). Using this technique, an estimate of the center of gravity is provided for the entire region determined to be true (illustrated as the shaded region of FIG. 8D). From FIG. 8D, the center of gravity of the shaded region is approximately 0.6, providing a numerical value for w(i).

After the reliability parameter w(i) is obtained, the next step of the block diagram of FIG. 4 is to use w(i) to improve the local motion estimation v(i) by the estimation modification 54. If w(i) is large, v(i) is used directly as the final local motion vector lmv(i). In contrast, if w(i) is very small, the averaged neighborhood motion h(i) is used as the estimated lmv(i), since the averaged neighborhood motion is more likely to be a better estimation than the less reliable v(i). If w(i) is neither very large nor very small, it is used as a weighting factor to average v(i) and h(i). For instance, if w(i)=0.6, as in the above example, then the local motion vector lmv(i) is given by the following equation:

$$lmv(i)=0.6v(i)+(1-0.6)h(i)$$

The estimated local motion vector lmv(i) is then used to determine the magnitude of the second term in the relative Doppler frequency $f_d''$ relation. In the i'th sub-frame region, the image motion vector in the y direction is given by the following equation:

$$VI_y(i)=DI_y(i)FR$$

in which $DI_y(i)$ represents the measured displacement lmv(i) in the y direction of the i'th sub-frame region 45, and FR represents the frame rate between consecutive ones of the image frames. From the determination of the image motion vector in the y direction, the magnitude of the relative Doppler frequency $f_d''$ can be expressed by the following equation:

$$f_d''(i) = f_d'(i) - \frac{2DI_y(i)\,FR}{c}\,f_0$$

The high pass filter described above is implemented as a variable notch filter, illustrated at 27 in FIG. 4. The center frequency of the variable notch filter 27 is the second term of the relative Doppler frequency $f_d''$ relation. The Doppler signal is filtered by the variable notch filter 27 to remove the image motion artifacts, resulting in the biased Doppler flow signal $f_d'(i)$. Then, the second term of the relative Doppler frequency $f_d'$ relation is subtracted from the biased Doppler flow signal $f_d'(i)$ to yield the true flow frequency signal $f_d''(i)$.

Therefore, in the i'th sub-frame region, the blood motion vector in the presence of image motion is given by the following equation:

$$VB'(i) = \frac{f_d''(i)\,c}{2f_0 \cos\theta}$$

From this determination of the blood motion vector VB'(i), any artifacts due to image motion are completely eliminated from the blood flow estimation. The corrected blood motion vector VB'(i) can then be provided to the display sub-system 20. As a result, an accurate representation of blood flow is provided which will not be affected by either transducer motion or tissue motion.

What is claimed is:

1. In an ultrasonic diagnostic system, including means for receiving Doppler information signals having motion components due to fluid flow and/or image motion, and means for formatting said Doppler information signals for display, a method for removing effects of image motion from the information to be displayed comprising the steps of:

demodulating said Doppler information signals to provide Doppler signal samples containing a fluid motion component and an image motion component;

estimating an image motion vector by comparing successive image frames;

deriving a center Doppler frequency value for said image motion component utilizing said estimated image motion vector; and deriving a fluid motion vector from said derived center Doppler frequency value.

2. The method of claim 1, wherein the step of deriving a center Doppler frequency value for said image motion component further comprises the step of deriving a relative Doppler frequency value between a fluid motion Doppler frequency component and an image motion Doppler frequency component.

3. The method of claim 1, wherein the step of deriving a fluid motion vector further comprises the step of filtering the Doppler signal samples utilizing the derived center Doppler frequency value.

4. The method of claim 1, wherein said step of estimating an image motion vector further comprises the steps of:

dividing a current image frame into a plurality of sub-image regions; and estimating local motion vectors of the respective sub-image regions between the current image frame and a previous image frame.

5. In ultrasonic diagnostic system, including means for receiving Doppler information signals having motion components due to fluid flow and/or image motion, and means for formatting said Doppler information signals for display, a method for removing effects of image motion from the information to be displayed comprising the steps of:

demodulating said Doppler information signals to provide Doppler signal samples containing a fluid motion component and an image motion component;

dividing a current image frame into a plurality of sub-image regions;

calculating an initial estimation of the local motion vectors using a fast adaptive coarse/fine minimum-sum-absolute-difference (MSAD) search;

deriving a final estimation of the local motion vectors from the initial estimation of the local motion vectors by use of a fuzzy logic technique;

deriving a center doppler frequency value for said image motion component utilizing said estimated image motion vector; and filtering the Doppler signal samples utilizing the derived center Doppler frequency value.

6. The method of claim 5, wherein the step of deriving a final estimation further comprises the step of defining a first quality factor of the MSAD by measuring the difference between the value of MSAD and mean sum-absolute-difference (SAD).

7. The method of claim 6, wherein the step of deriving a final estimation further comprises the step of defining a second quality factor of MSAD by measuring deviation of the initial estimation of the local motion vector from a motion history vector.

8. The method of claim 7, wherein the step of deriving a final estimation further comprises the step of defining membership functions for the first and second quality factors.

9. The method of claim 8, wherein the step of deriving a final estimation further comprises the step of determining a membership value for the first and second quality factors.

10. The method of claim 9, wherein the step of deriving a final estimation further comprises the step of combining the membership values for the first and second quality factors in accordance with predefined fuzzy rules to generate an output value.

11. An ultrasonic diagnostic system, comprising:

means for receiving information signals having velocity components including fluid flow through a subject and/or image motion;

means for demodulating said information signals to provide Doppler signal samples containing a fluid motion component and an image motion component;

means for estimating an image motion vector by comparing successive image frames;

means for deriving a center Doppler frequency value of said image motion component utilizing said estimated image motion vector;

means for deriving a fluid motion vector from said derived center Doppler frequency value; and means for discriminating said image motion component from said information signals utilizing said fluid motion vector.

12. The system of claim 11, wherein said means for estimating an image motion vector further comprises:

means for dividing a current image frame into a plurality of sub-image regions; and means for estimating local motion vectors of the respective sub-image regions between the current image frame and a previous image frame.

13. An ultrasonic diagnostic system, comprising:

means for receiving information signals having velocity components including fluid flow through a subject and/or image motion;

means for demodulating said information signals to provide Doppler signal samples containing a fluid motion component and an image motion component;

means for dividing a current image frame into a plurality of sub-image regions;

means for calculating an initial estimation of the local motion vectors using a fast adaptive coarse/fine minimum-sum-absolute-difference (MSAD) search;

means for deriving a final estimation of the local motion vectors from the initial estimation of the local motion vectors by use of a fuzzy logic technique;

means for deriving a center Doppler frequency value of said image motion component utilizing said estimated image motion vector;

means for deriving a fluid motion vector from said derived center Doppler frequency value; and means for discriminating said image motion component from said information signals utilizing said fluid motion vector.

14. The system of claim 13, wherein said means for deriving a final estimation further comprises a first quality factor of the MSAD derived by measuring the difference between the value of MSAD and mean sum-absolute-difference (SAD).

15. The system of claim 14, wherein said means for deriving a final estimation further comprises a second quality factor of MSAD derived by measuring deviation of the initial estimation of the local motion vector from a motion history vector.

16. The system of claim 11, wherein said means for deriving a fluid motion vector further comprises means for filtering the Doppler signal samples utilizing the derived center Doppler frequency value as a reference.

17. The system of claim 11, wherein said means for deriving a center Doppler frequency value for said image motion component further comprises means for deriving a relative Doppler frequency value between said fluid motion Doppler frequency component and said image motion Doppler frequency component.

18. An ultrasonic signal processing system, comprising:

an ultrasonic receiver providing electrical signals representative of consecutive image frames, said information signals further comprising Doppler frequency components due to fluid flow and/or image motion;

means for estimating an image motion vector from a comparison of said consecutive image frames;

a fluid flow processor coupled to said transducer and comprising means for deriving a center frequency value of said image motion frequency component utilizing said estimated image motion vector, means for deriving a fluid motion vector from said derived center frequency value, and means for discriminating said image motion frequency component from said fluid flow frequency component utilizing said derived fluid motion vector; and means for formatting said electrical signals for display of said consecutive image frames including an indication of fluid flow velocity.

19. The system of claim 18, wherein said means for deriving a fluid motion vector further comprises means for filtering the signals utilizing the derived center frequency value.

20. The system of claim 18, wherein said means for deriving a center frequency value for said image motion frequency component further comprises means for deriving a relative frequency value between said fluid motion frequency component and said image motion frequency component.

* * * * *